United States Patent [19]

Dostrovsky

[11] 4,249,513

[45] Feb. 10, 1981

[54] SOLAR COLLECTOR

[75] Inventor: Israel Dostrovsky, Rehovot, Israel

[73] Assignee: Yeda Research and Development Co. Ltd., Rehovot, Israel

[21] Appl. No.: 840,379

[22] Filed: Oct. 7, 1977

[30] Foreign Application Priority Data

Oct. 10, 1976 [IL] Israel ........................................ 50603

[51] Int. Cl.³ ................................................ F24J 3/02
[52] U.S. Cl. ...................................... 126/438; 126/448
[58] Field of Search ............... 126/270, 271, 438–440, 126/448; 237/1 A; 350/293, 299

[56] References Cited

U.S. PATENT DOCUMENTS

| | | | |
|---|---|---|---|
| 3,866,285 | 2/1975 | Clark | 126/271 |
| 3,982,527 | 9/1976 | Cheng et al. | 126/270 |
| 3,991,740 | 11/1976 | Rabl | 126/270 |
| 3,994,279 | 11/1976 | Barak | 126/271 |
| 4,003,366 | 1/1977 | Lightfoot | 126/271 |
| 4,022,188 | 5/1977 | Cohen et al. | 126/271 |
| 4,088,116 | 5/1978 | Pastor | 126/270 |

FOREIGN PATENT DOCUMENTS

| | | | |
|---|---|---|---|
| 1287760 | 2/1962 | France | 126/270 |
| 2352260 | 12/1977 | France | 126/271 |

Primary Examiner—James C. Yeung
Attorney, Agent, or Firm—Browdy and Neimark

[57] ABSTRACT

A solar collector unit comprises a body of rigid thermally insulating material having a surface in the shape of about half a cylindrical parabola, the parabolic surface being provided with a reflective surface, a conduit being positioned with its long axis in the median plane of the parabola, said conduit serving as conduit for the heat-exchange medium, the surface of said conduit facing the parabolic surface being a selective surface, a transparent cover being provided on top of the device.

9 Claims, 3 Drawing Figures

SOLAR COLLECTOR

FIELD OF THE INVENTION

The present invention relates to a novel collector module for the collection of solar energy. More particularly, the present invention relates to a novel collector for solar energy which results in an efficient collection of solar energy which makes it possible to heat a given fluid such as absorption refrigerators and the like, said collector module resulting in a predetermined factor of multiplication of solar energy on the collector surface used. Furthermore, the novel collector modules can be positioned in such manner that no or little adjustment is necessary, and thus the necessity of tracking of the sun is eliminated.

BACKGROUND OF THE INVENTION

Many applications of solar energy are through its thermal effects. In these, solar radiation is absorbed by special surfaces and the energy converted to heat. The heat generated can then be used either directly, to provide for example domestic or industrial hot water, space heating or process heat; or the heat can be converted to mechanical energy (which can then be further converted to electricity) or to drive absorption cycle refrigerators. For the latter applications high temperature heat is an advantage since the efficiency of the processes is greatly improved.

Commercial flat plate collectors available today cannot provide sufficiently high temperature for the efficient conversion to mechanical energy or to drive absorption refrigerators. Methods are known for the production of high temperatures from solar energy. These use concentrating devices such as lenses or mirrors. Indeed some of the very highest temperatures on earth have been reached in such solar furnaces.

The main disadvantage of such devices for general application is the need for accurate tracking of the sun in its apparent motion through the sky. The higher the concentration (and therefore temperature) the more precise has to be the tracking mechanism.

For a number of applications of wide utility very high temperatures are not essential. Thus, for space heating and cooling, using absorption refrigeration cycles, moderate temperatures somewhat above the boiling point of water are sufficient. Also, special turbines exist which can run on relatively low heat sources. For such applications it is possible to dispense with high concentration and therefore with the need of tracking.

SUMMARY OF THE INVENTION

The present invention relates to collectors for solar energy adapted to result in the heating of a working fluid or of water to a predetermined temperature, generally well above the boiling point of water. The novel collectors are advantageously provided in the form of a plurality of units constituting modules, which modules can be produced economically and which can be joined to form larger units. The novel collectors require no tracking of the sun during the day, and it is necessary to adjust their position once or twice a year if high efficiencies are desired.

The novel collectors for solar energy are shaped in the form of about half a cylindrical parabola and a channel-formed member positioned with its longitudinal axis coinciding with the axis of the parabola, this member defining one or more conduits, the surface of the parabola being provided with reflecting means, said channel-formed member serving as conduit or conduits of a fluid heated by the solar energy incident on said channel-formed member. The ratio of collection surface defined by the upper surface of the half-cylindrical parabola and the channel-formed member to the height of the said channel-formed member defines the intensification factor of the system, and this is chosen in such manner as to result in the desired heating of the liquid passing through said channel-formed member. According to a preferred embodiment of the invention, modules are provided comprising a plurality of consecutive units of the type described above. A number of such modules may be joined to form a unit of desired size.

The collectors are advantageously provided with a transparent cover. The individual collector consists advantageously of a shaped body of suitable rigid thermal insulating material, such as plastic (advantageously rigid foamed plastic), wood, composite material, or the like. The smooth cylindrical parabolic surface is advantageously coated with a reflective coating, such as aluminum or the like. In the median plane of the parabola there is positioned a channel-formed member, advantageously made of metal, one face of which (facing the parabola) is provided with a selective surface, said channel being used as conduit of the heat-transfer medium. When modules of a plurality of units are used, the individual units are advantageously connected in series or in parallel or in a mixed arrangement, depending on the desired final temperature of the heat-transfer fluid. The channel-formed member may be divided into two or more individual conduits.

A module comprising a plurality of such individual units may be enclosed in a box-like structure having a transparent upper surface, such as glass, transparent plastic, or the like. Modules according to the invention are advantageously mounted with the long cylindrical axis running east-west, the plane of the box-like structure being tilted south by an angle depending on the latitude of the site where the collector is used. The angle should be such that when the sun is at its maximum altitude, the rays of the sun will be substantially normal to the plane of the collection module.

The invention will now be illustrated by way of example only with reference to the enclosed drawings which are schematical and not according to scale and in which.

Figure 2:
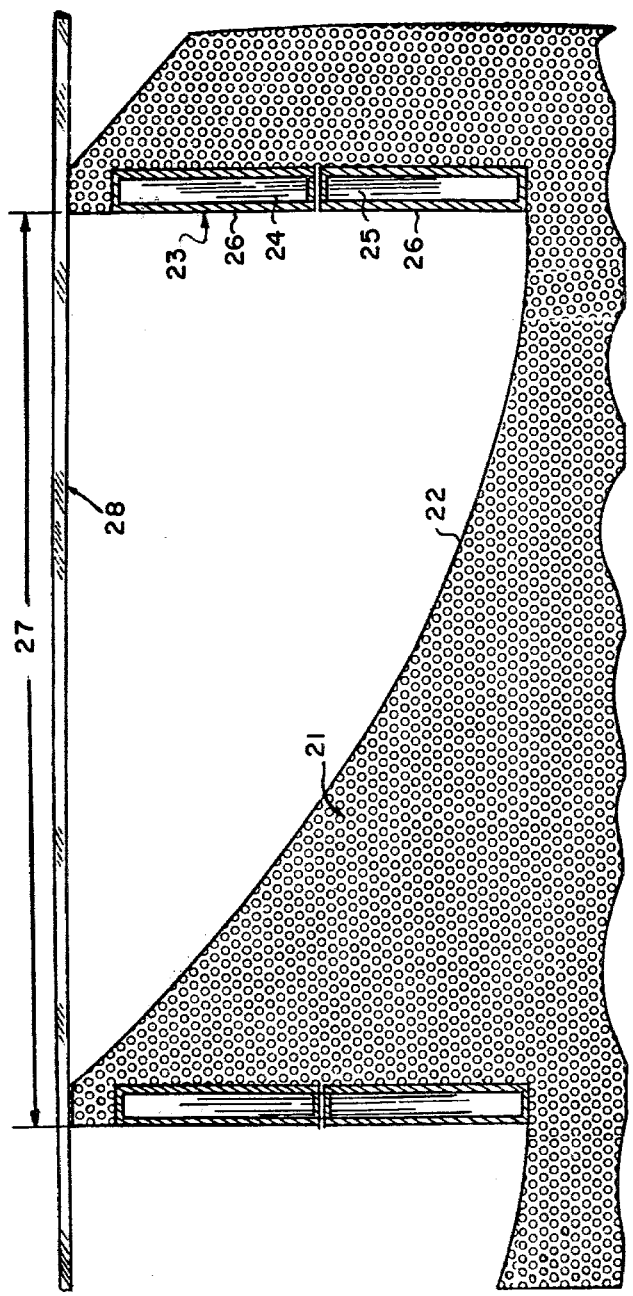
FIG. 2 is a sectional side view through a collector unit according to the invention.

A collector according to the invention is shown in FIG. 2, which collector comprises a body 21 made of rigid insulating material such as plastic, wood or the like, which has a cylindrical parabolic surface 22 which is coated with a reflective material such as aluminum or the like. Actually, the body 21 has a surface which is about half a cylindrical parabola, and in its median plane there is positioned a channel-formed metallic member 23 which defines two conduits 24 and 25 through which there flows the heat-exchange fluid, said channels being provided on the surface facing the parabola with a selective surface 26. Typically, there is chosen a ratio of opening 27 through which the light enters to height of the channel 23 of about 2:1 to about 3:1. A collector was built which had a channel of 5 cm height, the opening 27 being about 10 cm, the width of the conduit (internal) being about 3 mm. On top of the parabolic unit there was provided a glass sheet 28 of about 2 mm thickness.

This element consists, typically, of a thin flat metallic channel, one face of which is provided with a selective surface. Any of a number of surfaces described in the literature may be used. When the elements are assembled in the module the treated surface faces the reflecting surface of the adjacent elements. Inside the narrow channel flows the heat-transfer fluid. After assembly, the channels of all the elements are connected in series or parallel arrangement with each other and with other outputs.

Figure 1:
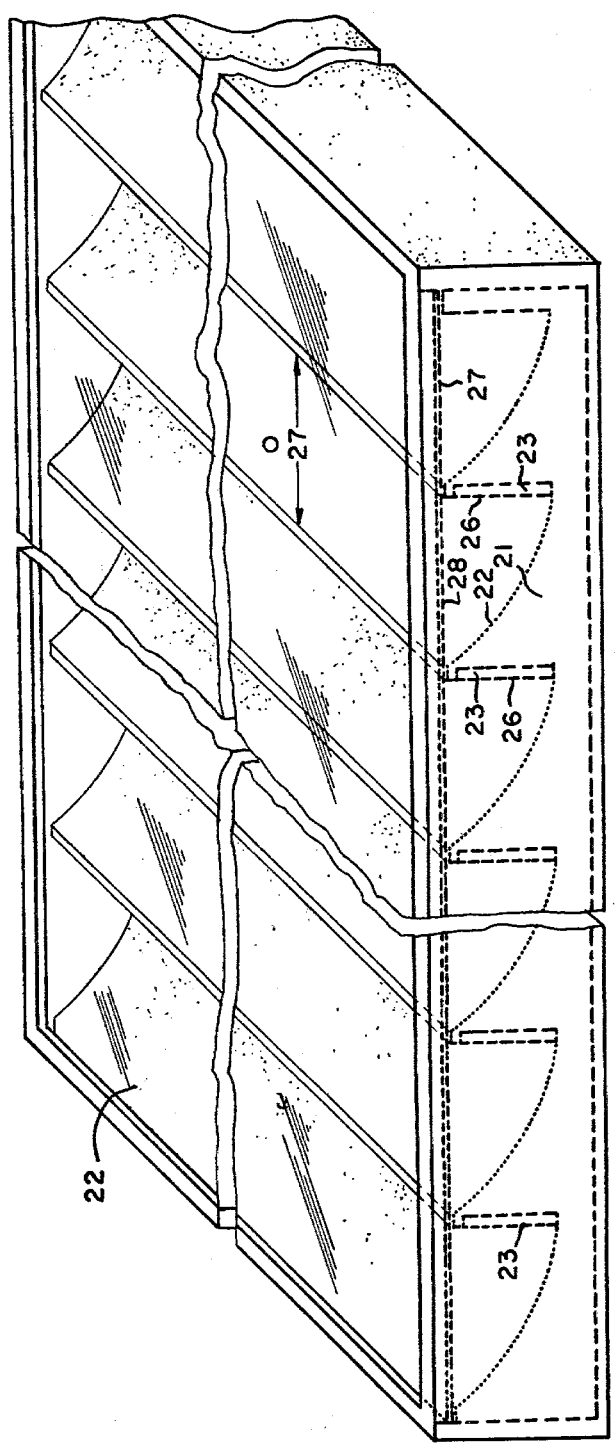
FIG. 1 is a perspective side view in partial section of a module comprising a plurality of collector units.

FIG. 1 illustrates a module comprising a plurality of such collector units, but with a single conduit in each unit, arranged one after the other; the conduits of the channels being connected as desired (in series, in parallel, or a combination of these). The components are numerated as in FIG. 2.

Figure 3:
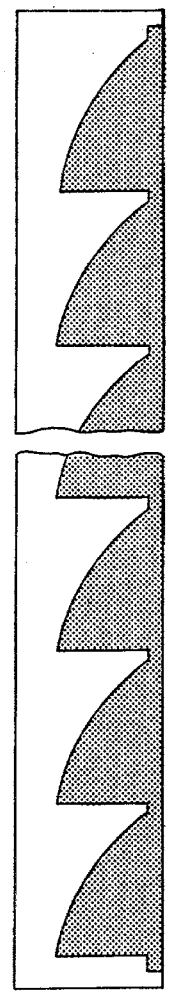
FIG. 3 is a sectional side view of a mold for the production of modules of the type set out in FIG. 1.

FIG. 3 illustrates a mold 31 made of any suitable material such as metal, coated wood, or plastic, or the like, which can be used for the production of such modules. These are advantageously produced from rigid plastic foam or the like.

The whole assembly of cylindrical parabolic reflectors is enclosed in a box provided with transparent window in its upper face. This window may be made of one or more panes of glass or sheets of suitable plastic material.

The space between the reflectors and the window may be filled with air or with other gases of lower convectivity (such as Ar, Kr or other suitable materials).

The module is mounted with the long cylindrical axis of the reflectors running east-west, and the plane of the box tilted south by an angle depending on the latitude of the site where the collector is used. The angle should be such that when the sun is at its maximum altitude its rays are normal to the plane of the collection module. The dimensions of the reflectors may be defined in terms of the focal length of the parabola defining the reflecting surface and the distance between successive reflectors (the opening—o—through which the light enters the assembly). This is analogous to the f-number used to define light gathering power in optical instruments. Thus we may speak of an $f=\frac{1}{2}$ reflector when the distance between reflectors is twice the focal length. It is desirable, of course, to have as small an f-number as possible. A convenient value is $f=\frac{1}{2}$ for getting then little or no adjustment in the angle of tilt of the module is necessary to maintain reasonable efficiency for all seasons.

The action of a typical reflector of $f=\frac{1}{2}$ is quite easy to follow. When the sun is low (morning and evening) the absorbing surface is illuminated directly and all the light passing through the opening is collected. As the sun rises, some of the radiation will fall on the reflector and be directed towards the absorbing surface. As the sun gets higher in the sky an increasing proportion of the radiation will reach the absorbing surface after reflection. At maximum solar altitudes all the radiation entering the opening will be reflected onto the absorbing surface and none will reach it directly. Under all conditions all the radiation from the sun entering through the opening, o, is absorbed by the collecting surface. Since the area of the opening, o, is twice the area of the absorbing surface, it is easy to see that a concentration factor of two is obtained.

Since the focused line image of the solar radiation is smaller than the dimensions of the heat absorbing element and since it moves across this element twice a day, the possibility exists for a further increase of the efficiency of the collector. While only a part of the absorbing element is involved in absorbing the radiation at any one instant, the whole of the absorber element is involved in the heat loss process. By splitting the absorber element into several parallel elements, only one of them can be made to be active at any one time and thus the heat losses reduced in proportion.

The principle outlined above may be illustrated by an example involving an absorbing element made of two adjacent channels (see FIG. 2). When the focused radiation falls on the lower channel (morning, evening) the flow of fluid is switched to this channel. When the focused radiation moves to the upper channel the flow is switched correspondingly. This action is achieved by means of automatic valves which get their signal either from a timer or from a temperature sensor suitably placed.

In applications where large temperature rises are expected in each pass through the collector it may be advantageous to arrange the flows in such a way that the inactive channel acts as the preheater of the fluid for the active channel. This can also be achieved by means of automatic one way valves.

It is clear that the principle outlined above is valid for any number of parallel channels and is not limited to the case of two channels used in the illustration above.

This type of solar collector may be produced by several methods. Individual reflector elements may be produced from suitable plastic material by injection molding, extrusion or vacuum forming. The reflecting surface and the heat absorbing channel are then added, the elements then assembled into a module, usually of dimension 1×2 meters.

According to a preferred method integral modules are produced directly. In this method, which is part of the present invention, use is made of the reinforced polyester and rigid plastic foam casting technique. The heat absorbing channels (treated to possess a selective outside surface) are assembled and connected together in series to form a rigid structure. The structure is then placed into a mold and the reflecting film (aluminum foil, aluminized mylar or similar material) is applied to the curved surfaces of the mold (see FIG. 3). A reinforced polyester layer is then applied to the mold by standard techniques and the voids are then filled with a suitable rigid foam formulation. Upon release from the mold an almost complete solar collecting module is obtained. It is only necessary to fit the glass or plastic window and the module is ready for installation.

It is clear that the above description is by way of illustration only and that many variations and modifications in the arrangement and nature of the parts may be resorted to without departing from the scope and spirit of the invention.

I claim:

1. A solar collector for heating a working fluid to a predetermined temperature above the boiling point of water, comprising:

a plurality of collector units each having a body of rigid thermally insulating material having a surface in the shape of about half a cylindrical parabola, said units being spaced closely adjacent to one another, the parabolic surface of each said unit being provided with a reflective surface;

a conduit being positioned in each said unit facing the parabolic surface and positioned with its long axis in the median plane of the parabola, said conduit serving as a conduit for the working fluid, the surface of said conduit facing the parabolic surface being a selective surface;

a transparent cover provided over the units and disposed generally perpendicular to the planes of said conduits;

means for arranging said units with the long cylindrical axes of the reflectors running east-west;

the ratio of the width of the opening of each said unit over which said transparent cover lies, to the height of the selective surface being at least 1.5 to 1; and means for disposing said units at an angle tilted south such that when the sun is at its maximum altitude its rays are substantially normal to the plane of said transparent cover.

2. A solar collector unit according to claim 1 wherein the conduit is in the form of a channel-shaped member.

3. A solar collector according to claim 2, wherein the channel-formed member defines a plurality of conduits, and means for selectively passing the heat exchange medium through one or more of said conduits.

4. A solar collector unit according to claim 1, wherein the ratio of the width of the opening to the height of the selective surface is about from 1.5 to 1 to about 3 to 1.

5. A solar collector according to claim 4, wherein the ratio is about 2:1.

6. A solar collector according to claim 1, wherein the body of the collector is made of foamed plastic.

7. A module according to claim 1, wherein the units are connected in parallel.

8. A module according to claim 1, wherein the units are connected in series.

9. A solar collector according to claim 1, wherein said body is made of foamed plastic; said conduit constitutes a plurality of parallel elements, one on top of another; and further comprising means for controlling the passage of working fluid through a selected one of said parallel elements without passage of working fluid through another of said parallel elements.

* * * * *